United States Patent
Byun

(10) Patent No.: US 11,144,406 B2
(45) Date of Patent: Oct. 12, 2021

(54) MEMORY SYSTEM PERFORMING CHECK POINTING OPERATION AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 113 days.

(21) Appl. No.: 16/550,536

(22) Filed: Aug. 26, 2019

(65) Prior Publication Data

US 2020/0192768 A1    Jun. 18, 2020

(30) Foreign Application Priority Data

Dec. 12, 2018  (KR) ................ 10-2018-0159842

(51) Int. Cl.
*G06F 11/14*    (2006.01)
(52) U.S. Cl.
CPC ...... *G06F 11/1469* (2013.01); *G06F 2201/82* (2013.01); *G06F 2201/84* (2013.01)
(58) Field of Classification Search
CPC ... G06F 11/14; G06F 11/1469; G06F 2201/82
See application file for complete search history.

(56) References Cited

U.S. PATENT DOCUMENTS

| | | | | |
|---|---|---|---|---|
| 10,073,651 B2* | 9/2018 | Lee | ............... | G06F 11/1451 |
| 10,445,194 B2* | 10/2019 | Lee | ............... | G06F 3/065 |
| 10,732,874 B2* | 8/2020 | Jun | ............... | G11C 16/16 |
| 2014/0325126 A1 | 10/2014 | Choi et al. | | |
| 2015/0193464 A1* | 7/2015 | Kwon | ............... | G06F 16/1815 707/648 |
| 2018/0081552 A1* | 3/2018 | Lee | ............... | G06F 3/065 |
| 2019/0188082 A1* | 6/2019 | Lee | ............... | G06F 12/0246 |
| 2019/0354288 A1* | 11/2019 | Jun | ............... | G06F 11/1048 |
| 2020/0034081 A1* | 1/2020 | Lee | ............... | G06F 3/0679 |
| 2020/0081646 A1* | 3/2020 | Byun | ............... | G06F 3/0608 |
| 2020/0090778 A1* | 3/2020 | Lee | ............... | G06F 11/1438 |
| 2020/0159455 A1* | 5/2020 | Lee | ............... | G06F 11/1048 |

FOREIGN PATENT DOCUMENTS

KR    10-2015-0082010    7/2015

* cited by examiner

*Primary Examiner* — Kamini B Patel
(74) *Attorney, Agent, or Firm* — IP & T Group LLP

(57) ABSTRACT

A memory system includes a plurality of dies including a plurality of memory blocks, each die including a first region and a second region; and a controller which includes a memory storing plural pieces of check point information and a processor, wherein the processor includes: a check point manager suitable for performing a check pointing operation by programming identification information and check point information on the plurality of memory blocks, according to the size of the plural pieces of; and a recovery manager suitable for resuming an operation stopped due to a sudden power-off (SPO) by using last check point information and last identification information, which are programmed last in memory blocks in each of the dies when the SPO occurs.

19 Claims, 13 Drawing Sheets

MEMORY SYSTEM PERFORMING CHECK POINTING OPERATION AND OPERATING METHOD THEREOF

CROSS-REFERENCE TO RELATED APPLICATIONS

The present application claims priority under 35 U.S.C. § 119(a) to Korean Patent Application No. 10-2018-0159842, filed on Dec. 12, 2018, the disclosure of which is incorporated herein by reference in its entirety.

BACKGROUND

1. Field

Various embodiments of the present invention generally relate to a memory device. Particularly, the embodiments relate to a memory system, and an operating method thereof.

2. Description of the Related Art

Recently, the paradigm for the computer environment has shifted to ubiquitous computing, which allows computer systems to be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

SUMMARY

Various embodiments of the present invention are directed to a memory system capable of improving the performance of an interleaving operation of multiple dies, and an operating method of the memory system.

In accordance with an embodiment, a memory system comprising: a plurality of dies including a plurality of memory blocks, each die including a first region and a second region; and a controller which includes a memory storing plural pieces of check point information and a processor, wherein the processor includes: a check point manager suitable for performing a check pointing operation by programming identification information and check point information on the plurality of memory blocks, according to the size of the plural pieces of; and a recovery manager suitable for resuming an operation stopped due to a sudden power-off (SPO) by using last check point information and last identification information, which are programmed last in memory blocks in each of the dies when the SPO occurs.

In accordance with an embodiment, an operating method of a memory system including a controller that includes a memory and a processor, and a plurality of dies that include a plurality of memory blocks, the operating method comprising: calculating the number of one or more target dies to perform a first check pointing operation according to the size of check point information stored in the memory; programming essential check point information and identification information corresponding to the essential check point information by sequentially performing the first check pointing operation on memory blocks in one or more dies, among the plurality of dies, according to the calculated number of target dies; checking whether the calculated number of target dies is equal to the number of the plurality of dies; and programming dummy check point information and identification information corresponding to the dummy check point information by performing a second check pointing operation on remaining target dies except for the target dies among the plurality of dies, when the calculated number of target dies is less than the number of the plurality of dies.

In accordance with an embodiment, a memory system comprising: a plurality of dies, each die including a plurality of memory blocks for storing multiple pieces of check point information; and a controller suitable for: sequentially programming the multiple pieces of check point information in corresponding blocks of the plurality of dies; reading multiple pieces of check point information from lastly programmed memory blocks of the plurality of dies; determining whether the multiple pieces of check point information are continuous; and performing a recovery operation using the multiple pieces of check point information when it is determined that the multiple pieces of check point information are continuous.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not to be construed as being limited to the embodiments set forth herein. Rather, the described embodiments are provided so that this disclosure is thorough and complete and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Various embodiments of the present invention are described in detail below with reference to the attached drawings.

Figure 1:
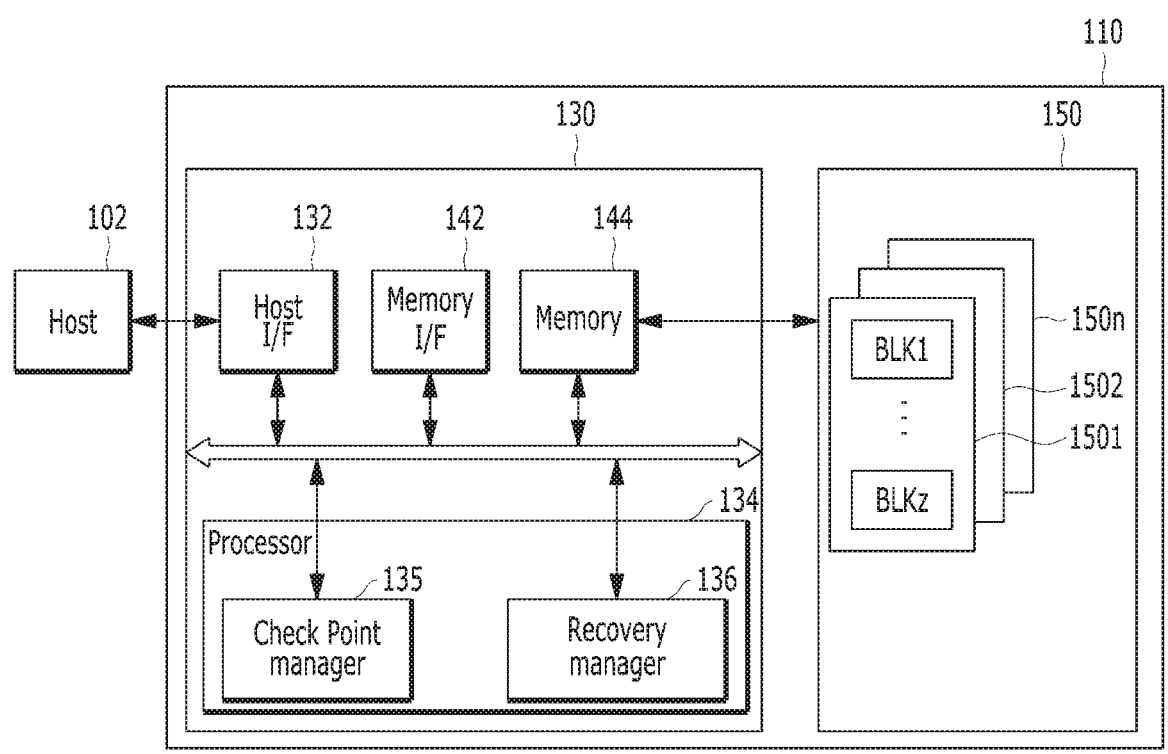
FIG. 1 is a block diagram illustrating a data processing system including a memory system in accordance with an embodiment of the present invention.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, portable electronic devices such as a mobile phone, an MP3 player and a laptop computer or electronic devices such as a desktop computer, a game machine, a television (TV) and a projector, that is, wired and wireless electronic devices.

The host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a controller 130 and a memory device 150 which stores data to be accessed by the host 102. The controller 130 controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various circuitry elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150$n$.

Each of the plurality of memory dies 1501 to 150$n$ includes a plurality of memory blocks BLK1 to BLKz, each of which includes a plurality of pages. Each of the pages includes a plurality of memory cells to which a plurality of word lines (WL) are coupled. The memory device 150 includes a plurality of planes, each of which includes a plurality of memory blocks, e.g., blocks BLK1 to BLKz. In particular, the memory device 150 may include a plurality of memory dies 1501 to 150*n*, each of which includes a plurality of planes. The memory device 150 may be a nonvolatile memory device, for example, a flash memory. The flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface (I/F) 132, a processor 134, a memory interface (I/F) 142 and a memory 144.

The host interface unit 132 may handle commands, data, and the like received from the host 102. By way of example but not limitation, the host interface unit 132 may include a command queue.

The host interface 132 processes the commands and data of the host 102, and may be configured to communicate with the host 102 through at least one of various interface protocols such as universal serial bus (USB), multimedia card (MMC), peripheral circuitry interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 132 may be driven through firmware referred to as a host interface layer (HIL), which is a region which exchanges data with the host 102.

The memory interface 142 serves as a memory interface and/or storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, as a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through firmware, referred to as a flash interface layer (FIL), which is a region which exchanges data with the memory device 150.

The memory 144, as the working memory of the memory system 110 and the controller 130, stores data for driving of the memory system 110 and the controller 130. When the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data to perform read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls various operations of the memory system 110. In particular, the processor 134 controls a program operation or a read operation for the memory device 150, in response to a write request or a read request from the host 102. The processor 134 drives firmware, referred to as a flash translation layer (FTL), to control the general operations of the memory system 110. The processor 134 may be more than one processor, each of which may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134. The controller 130 may perform a foreground operation as a command operation corresponding to a command received from the host 102. For example, the foreground operation includes a program operation corresponding to a write command, a read operation corresponding to a read command, an erase operation corresponding to an erase command or a parameter set operation corresponding to a set parameter command or a set feature command as a set command.

The processor 134 may include a check point manager 135 and a recovery manager 136. In other words, the check point manager 135 and the recovery manager 136 may be driven by the processor 134.

The check point manager 135 may program check point information stored in the memory 144 to each of the dies whenever a check pointing performance time arrives under the check pointing performance condition. The check point information may include essential check point information and dummy check point information. The essential check point information may include map information of a map segment, which is stored in the memory 144. The dummy check point information may include information generated using dummy data. Specifically, the check point manager 135 checks the number of one or more dies capable of programming the essential check point information according to the size of the essential check point information stored in the memory 144, that is, the size of the map segment, when the check pointing performance time arrives under the check pointing performance condition. Subsequently, the check point manager 135 programs the essential check point information to the memory blocks in one or more dies as many as the checked number of dies. The check point manager 135 checks whether dies other than the dies which store the essential check point information among the plurality of dies are present. When the check result indicates that the other dies are present, the check point manager 135 may program the dummy check point information by performing the check pointing operation on the other dies. When the check pointing operation is performed on the plurality of dies to program the check point information, plural pieces of identification information capable of identifying the check point information may be stored together. The controller 130 may not perform a barrier operation after completing the program operation on each of the dies, but immediately perform the check pointing operation when completing the program operation on each of the dies, thereby improving the performance of the interleaving operation.

The recovery manager 136 recovers a loss of data programmed into the plurality of memory devices by using the check point information and the identification information corresponding to the check point information when a sudden-power off (SPO) occurs in the memory system while the program operation is performed on the memory devices. In other words, when the SPO occurs, the check point information stored in the memory 144, which is a volatile memory, may not remain in the memory 144 after the power is supplied, whereas the check point information stored in the memory block, which is a non-volatile memory, may remain in the memory block even after the power is supplied. The recovery manager 136 may search for the last stored identification information among the plural pieces of identification information stored in the memory blocks of the dies, and control the memory system 110 to resume the operation which had been stopped due to the SPO, using the check point information corresponding thereto.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

In this regard, the check point manager 135 and the recovery manager 136 will be described in detail with reference to FIG. 5.

Figure 2:
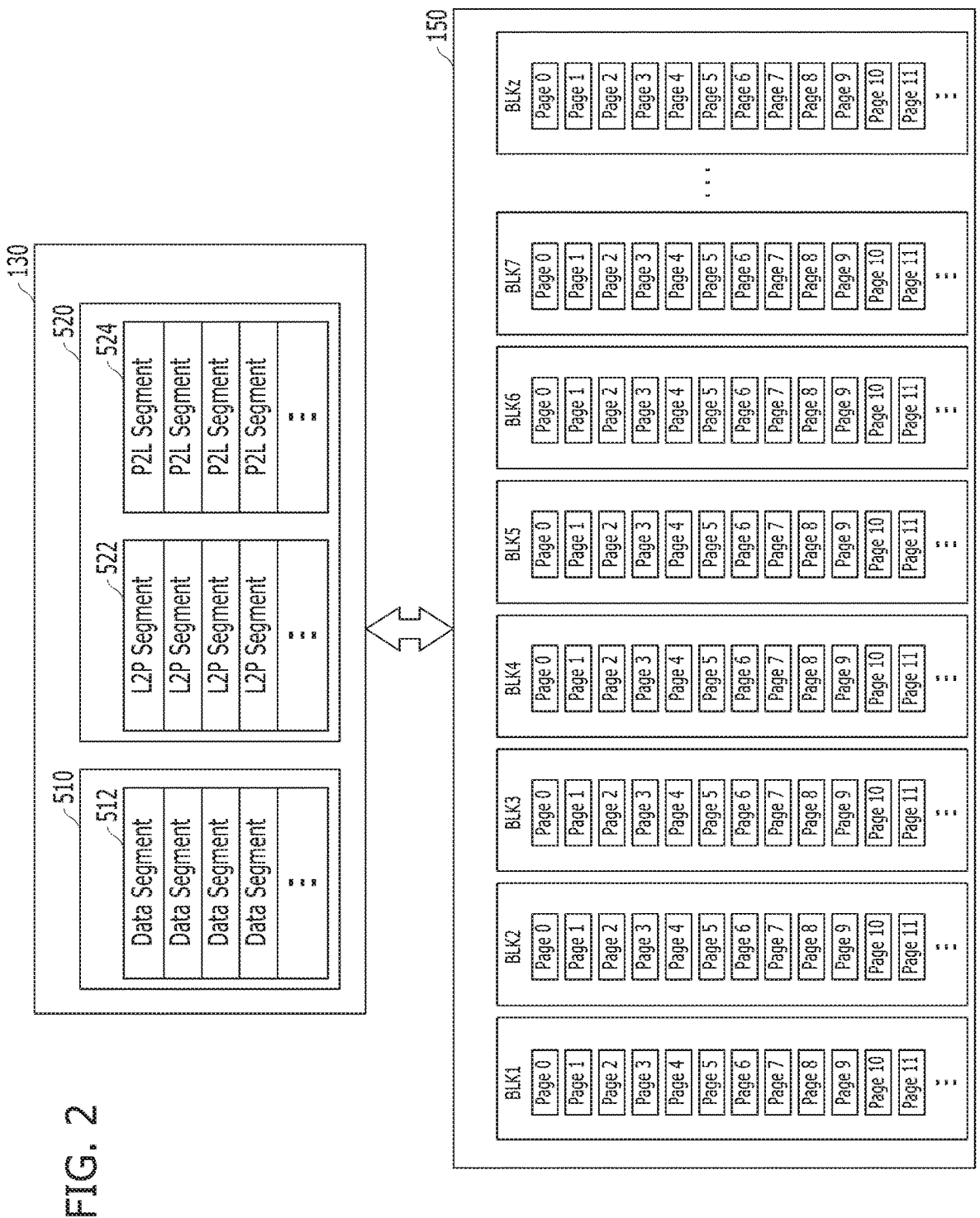
FIG. 2 is a diagram illustrating a data processing operation with respect to a memory device in a memory system in accordance with an embodiment.

FIG. 2 is a diagram illustrating a data processing operation with respect to a memory device in a memory system in accordance with an embodiment.

Referring to FIG. 2, the controller 130 may perform a command operation corresponding to a command received from the host 102, for example, a program operation corresponding to a program command. The controller 130 may program and store user data corresponding to the program command in the plurality of pages in memory blocks Block0 to Block 7 of the memory device 150. For reference, the memory blocks BLK1 to BLKz shown in FIG. 2 may correspond to the memory blocks BLK1 to BLKz of FIG. 1.

The controller 130 generates and updates metadata for the user data, and programs and stores the metadata in the memory blocks BLK1 to BLKz of the memory device 150. The metadata may include logical to physical (logical/physical or L2P) information and physical to logical (physical/logical or P2L) information for the user data stored in the memory blocks BLK1 to BLKz. Also, the metadata may include information on command data corresponding to a command received from the host 102, information on a command operation corresponding to the command, information on the memory blocks of the memory device 150 for which the command operation is to be performed, and information on map data corresponding to the command operation. The metadata may include various information and data, excluding user data, corresponding to a command received from the host 102.

For example, the controller 130 caches and buffers user data corresponding to a program command received from the host 102, in a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks BLK1 to BLKz of the memory device 150.

As the data segments 512 of the user data are programmed and stored in the pages in the memory blocks BLK1 to BLKz, the controller 130 generates L2P segments 522 and P2L segments 524 as metadata. The controller 130 may store the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks BLK1 to BLKz through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position obtained through the checking. That is, the controller 130 reads the data segments 512 from a specific page of a specific memory block among the memory blocks BLK1 to BLKz. Then, the controller 130 stores the data segments 512 in the first buffer 510, and provides the data segments 512 to the host 102.

Figure 3:
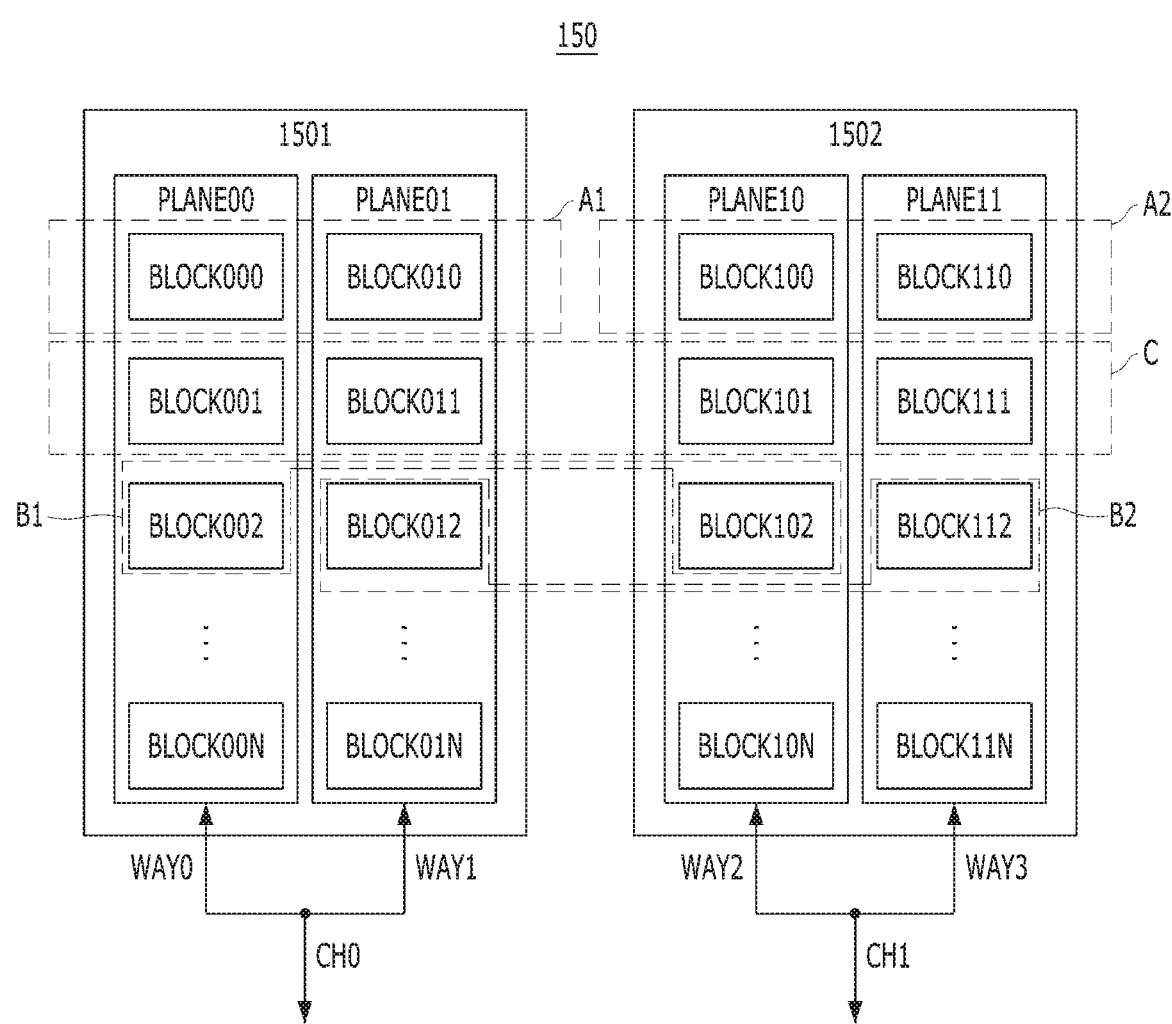
FIG. 3 is a diagram illustrating the concept of a super memory block in a memory system in accordance with an embodiment.

FIG. 3 is a diagram illustrating the concept of a super memory block in a memory system in accordance with an embodiment.

Referring to FIG. 3 the memory device 150 of the memory system 110 may include a plurality of memory dies 1501 to 150n. For example, the memory device 150 may include a first memory die 1501 and a second memory die 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the planes may include a plurality of blocks. For example, the first plane PLANE00 may include first to $N^{th}$ memory blocks BLOCK000 to BLCOK00N. The second plane PLANE01 may include first to $N^{th}$ memory blocks BLOCK010 to BLCOK01N. The third plane PLANE10 may include first to $N^{th}$ memory blocks BLOCK100 to BLCOK10N. The fourth plane PLANE11 may include first to $N^{th}$ memory blocks BLOCK110 to BLCOK11N.

The first memory die 1501 is capable of inputting and outputting data through a zeroth channel CH0. The second memory die 1502 is capable of inputting and outputting data through a first channel CH1. The zeroth channel CH0 and the first channel CH1 may input and output data in an interleaving scheme.

The first memory die 1501 includes the plurality of planes PLANE00 and PLANE01 corresponding to a plurality of ways WAY0 and WAY1, respectively, capable of inputting and outputting data in the interleaving scheme by sharing the zeroth channel CH0.

The second memory die 1502 includes the plurality of planes PLANE10 and PLANE11 corresponding to a plurality of ways WAY2 and WAY3, respectively, capable of inputting and outputting data in the interleaving scheme by sharing the first channel CH1.

The plurality of memory blocks in the memory device 150 may be divided into groups based on physical locations where the same way or channel is used.

While the embodiment of FIG. 3 shows a configuration of the memory device 150 in which there are two dies, each having two planes, the present invention is not limited to this configuration. Any suitable die and plane configuration may be used based on system design considerations. The number of memory blocks in each plane may vary as well.

The controller 130 of FIG. 1 may group memory blocks which can be selected simultaneously, among the plurality of memory blocks in different dies or different planes, based on their physical locations, and manage the memory block groups as super memory blocks.

The scheme in which the controller 130 groups the memory blocks into super memory blocks and manages the super memory blocks may be performed in various ways according to a designer's selection. Three schemes are described below as examples.

In accordance with a first scheme, the controller 130 groups a memory block BLOCK000 of the first plane PLANEOO and a memory block BLOCK010 of the second plane PLANE01 in the first memory die 1501 in the memory device 150, and manages the grouped memory blocks BLOCK000 and BLOCK010 as a single super memory block A1. When the first scheme is applied to the second memory die 1502, the controller 130 may group a memory block BLOCK100 of the first plane PLANE10 and a memory block BLOCK110 of the second plane PLANE11 in the second memory die 1502, and manage the grouped memory blocks BLOCK100 and BLOCK110 as a single super memory block A2.

In accordance with a second scheme, the controller 130 groups a memory block BLOCK002 in the first plane PLANE00 of the first memory die 1501 and a memory block BLOCK102 in the first plane PLANE10 of the second memory die 1502, and manages the grouped memory blocks BLOCK002 and BLOCK102 as a single super memory block B1. In addition, according to the second scheme, the controller 130 may group a memory block BLOCK012 in the second plane PLANE01 of the first memory die 1501 and a memory block BLOCK112 in the second plane PLANE11 of the second memory die 1502, and manage the grouped memory blocks BLOCK012 and BLOCK112 as a single super memory block B2.

In accordance with a third scheme, the controller 130 groups a memory block BLOCK001 in the first plane PLANEOO of the first memory die 1501, a memory block BLOCKO11 in the second plane PLANE01 of the first memory die 1501, a memory block BLOCK101 in the first plane PLANE10 of the second memory die 1502, and a memory block BLOCK111 in the second plane PLANE11 of the second memory die 1502, and manages the grouped memory blocks BLOCK001, BLOCK011, BLOCK101 and BLOCK111 as a single super memory block C.

Accordingly, memory blocks in each of the super memory blocks may be substantially simultaneously selected through the interleaving scheme such as a channel interleaving scheme, a memory die interleaving scheme, a memory chip interleaving scheme or a way interleaving scheme.

In accordance with embodiments of the invention, based on the pattern of the first logical block address (LBA) and the second LBA, the size of the map segment may be variably adjusted and updated to the memory device 150, thereby reducing the number of updates to the memory device 150.

While the present invention has been illustrated and described with respect to specific embodiments, it will be apparent to those skilled in the art in light of the foregoing description that various changes and modifications may be made without departing from the spirit and scope of the invention as defined in the following claims.

Figure 4A:
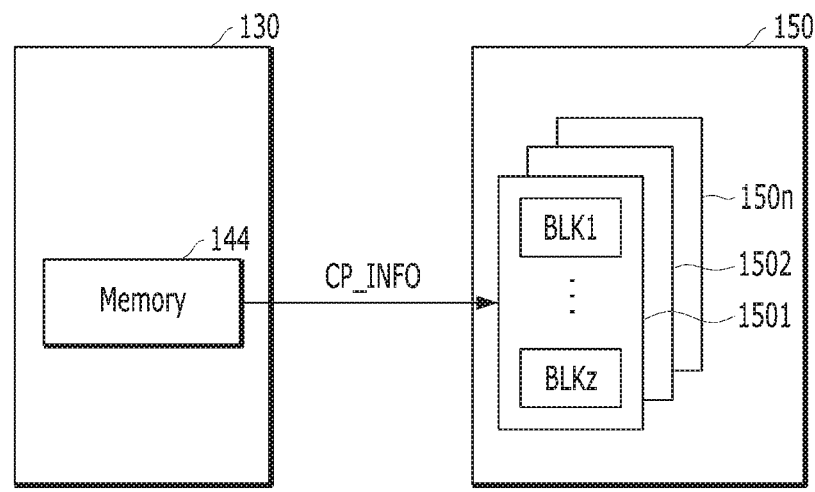
FIGS. 4A and 4B are diagrams illustrating a general check pointing operation.
Figure 4B:
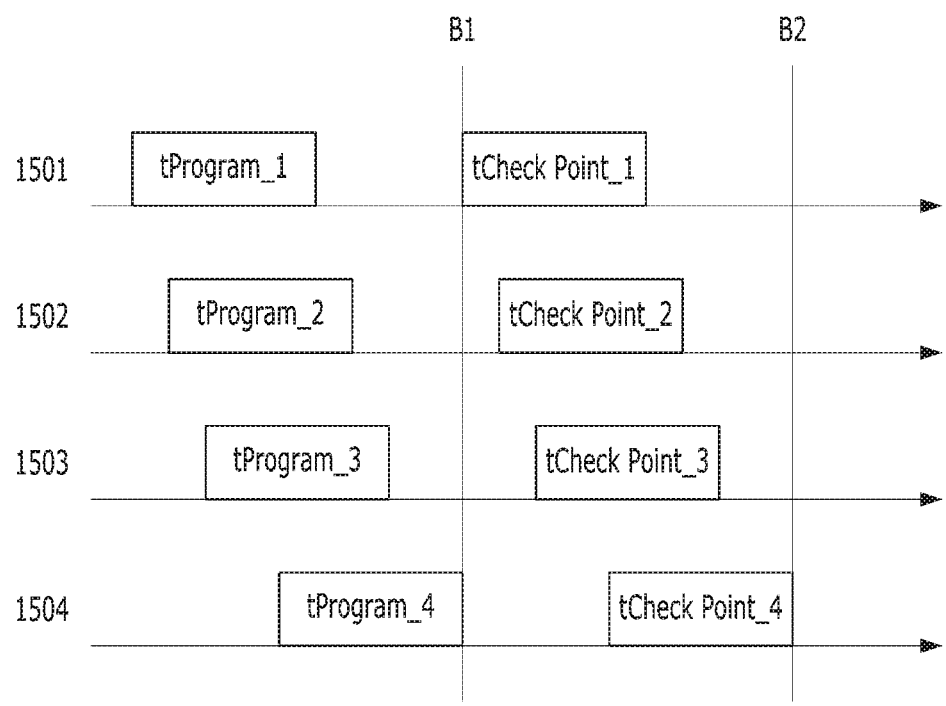

FIGS. 4A and 4B are diagrams illustrating a general check pointing operation.

Referring to FIG. 4A, the controller 130 may perform the check pointing operation of periodically programming check point information CP_INFO in the memory 144 to a memory block BLKz of a plurality of memory blocks BLK1 to BLKz in the memory device 150. The check point information may be data necessary for performing the background operation described above with reference to FIG. 1 or an operation according to a request of the host 102. The check pointing operation may be performed when the plurality of memory blocks in each of a plurality of dies 1501 to 150n, that is, open blocks, are updated on a data segment or map segment basis by means of an interleaving scheme under the control of the controller 130. The controller 130 may perform a barrier operation before and after performing the check pointing operation on the open blocks. The barrier operation is an operation indicating that the interleaving operation of the dies 1501 to 150n is broken. That is, the reason to perform the barrier operation is to ensure the data stored in the memory blocks in the memory dies 1501 to 150n until the check pointing operation is performed.

Referring to FIG. 4B, the controller 130 may perform first to fourth program operations tProgram_1 to tProgram_4 on the first to fourth dies 1501 to 1504, respectively. The controller 130 may perform a first barrier operation B1 when the first to fourth program operations tProgram_1 to tProgram_4 are completed. Subsequently, the controller 130 may perform first to fourth check pointing operations tCheck Point_1 to tCheck Point_4 on the first to fourth dies 1501 to 1504, respectively. The controller 130 may perform a second barrier operation B2 when the first to fourth check pointing operations tCheck Point_1 to tCheck Point_4 are completed. As such, an idle time may occur until the controller 130 performs the check pointing operations after the program operations are completed, and therefore, the performance of the interleaving operation performance for the dies may be degraded. In addition, in case where the controller 130 performs the barrier operations and the check pointing operations after completing the program operations on the first to fourth dies, the data that had been completely programmed before may be lost if an SPO occurs while the program operations are performed on the first to fourth dies. In order to solve this concern, detailed descriptions will be provided with reference to FIGS. 5 to 8.

Figure 5:
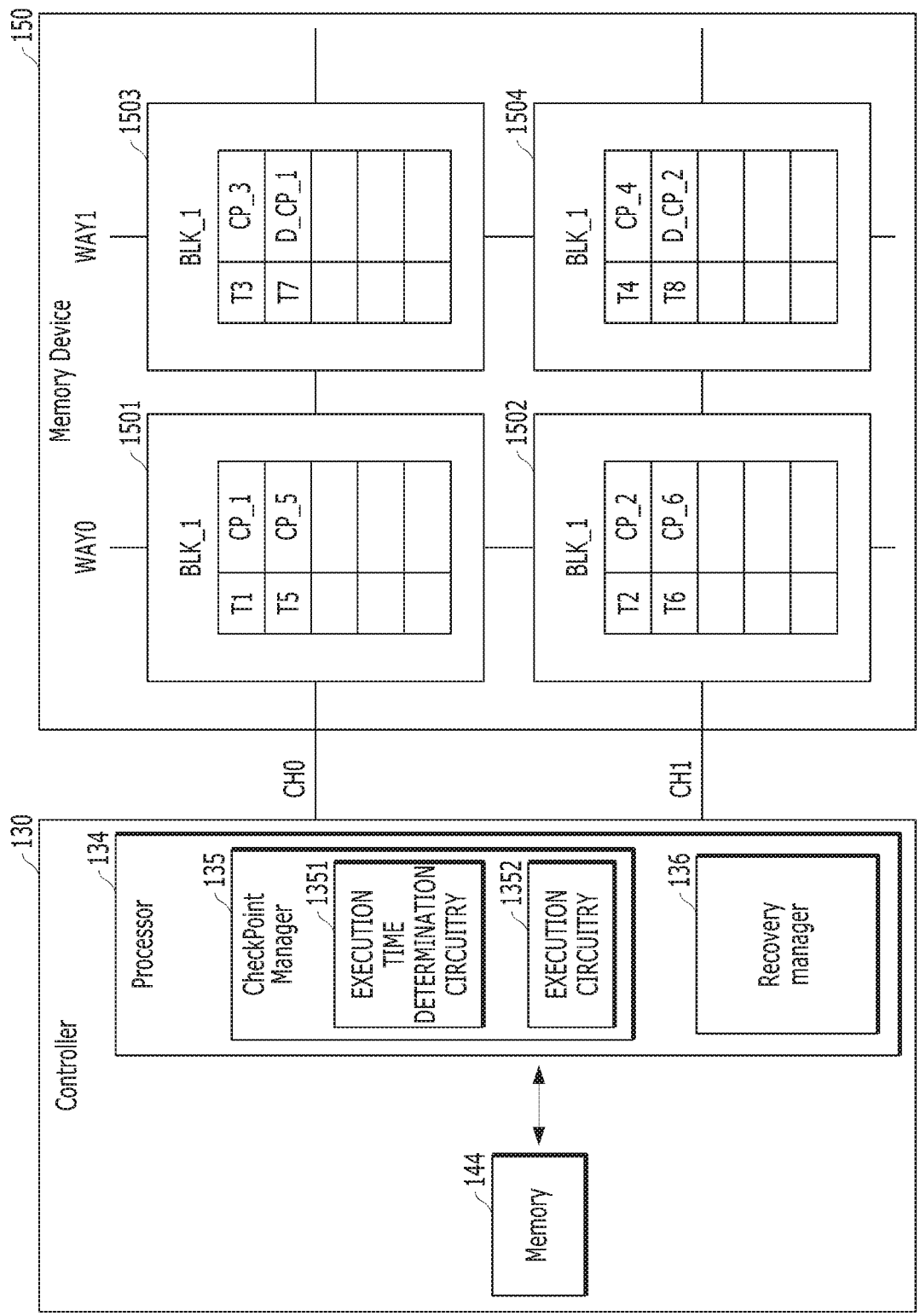
FIG. 5 is a diagram illustrating an operation of a memory system in accordance with an embodiment.

FIG. 5 is a diagram illustrating an operation of a memory system 110 in accordance with an embodiment. For example, FIG. 5 schematically shows only the configuration related to the present invention in the data processing system 100 of FIG. 1.

Referring to FIG. 5, the memory system 110 may include a memory device 150 and a controller 130.

The memory device 150 may include first to fourth memory dies 1501 to 1504. Each of the first to fourth memory dies 1501 to 1504 may include a first region and a second region. The first region may include a plurality of memory blocks capable of performing a command operation corresponding to a command received from a host. The second region may include a plurality of memory blocks capable of storing check point information according to a check pointing operation. For convenience, only the second region is illustrated in FIG. 5. For example, the second region of each die may include one memory block BLK_1, and the memory block BLK_1 may include 5 pages. The controller 130 may perform a one-shot program operation when programming data into each of the memory blocks in each die. The one-shot program operation represents an operation to program a plurality of bit data to a multi-level cell trough one program operation. At this time, the size of data, which is the unit of the one-shot program operation, may be defined as a "predetermined size". In other words, the size of data necessary for performing the one-shot program operation without dummy data on any one page in the first memory block of each die may be defined as the "predetermined size". For example, the predetermined size for each page of the first memory block of each die may be 32 KB, and data of 128 KB or less may be programmed into four dies by means of an interleaving scheme. Alternatively, the size of data may be set to the size greater or less than the predetermined size.

The controller 130 may include a memory 144 and a processor 134.

The memory 144 may include a check point information list CP_LIST in which check point information is periodically stored under the control of the controller 130. The check point information stored in the check point information list CP_LIST may be data necessary for performing a background operation or an operation according to a request of the host.

The processor 134 may include a check point manager 135 and a recovery manager 136.

The check point manager 135 may include an execution time determination circuitry 1351 and an execution circuitry 1352. The check point manager 135 may periodically check an execution time of a first check pointing operation through the execution time determination circuitry 1351. When the execution time of the first check pointing operation is checked, the execution circuitry 1352 may perform the first check pointing operation on the memory device 150. In this regard, detailed descriptions will be provided below.

The execution time determination circuitry 1351 may periodically check the execution time of the first check pointing operation, and determine whether to perform the first check pointing operation. A case where a target block is changed from a first open block to a second open block among the plurality of memory blocks in the first to fourth dies 1501 to 1504 or a case where the program operation is performed on the first to fourth dies 1501 to 1504 by a predetermined size may be set to the execution time of the first check pointing operation. In the present embodiment, it is described that the case where the target block is changed from the first open block to the second open block among the plurality of memory blocks in each of the first regions of the first to fourth dies 1501 to 1504 is set to the execution time of the first check pointing operation. Alternatively, the execution time of the first check pointing operation may be set in various ways.

The execution time determination circuitry 1351 checks whether open blocks among the plurality of memory blocks in the first regions of the first to fourth dies 1501 to 1504 are changed to closed blocks when the controller 130 receives a plurality of write commands from the host. In other words, the execution time determination circuitry 1351 checks whether the open blocks were changed to other open blocks. When the check result indicates that the open blocks among the memory blocks in the first to fourth dies 1501 to 1504 are not changed to the closed blocks, the controller 130 may perform write command operations corresponding to the write commands received from the host 102 on the open blocks in the dies by means of the interleaving scheme. When the check result indicates that the open blocks among the memory blocks in the first to fourth dies 1501 to 1504 were changed to the closed blocks, the execution time determination circuitry 1351 determines that it is time to perform the first check pointing operation.

The execution circuitry 1352 calculates the number of target dies 'N' for performing the first check pointing operation through the size of the check point information stored in the check point list of the memory 144. The execution circuitry 1352 may calculate the number of target dies 'N' by using the size of the check point information and the size set for each of the dies. The execution circuitry 1352 may perform the first check pointing operation by the number of target dies 'N'. The execution circuitry 1352 may check whether the number of entire dies 'A' is equal to the number of target dies 'N'. When the check result indicates that the number of entire dies 'A' is not equal to the number of target dies 'N' (that is, the number of target dies 'N' is less than the number of entire dies 'A'), the execution circuitry 1352 may perform a second check pointing operation on the remaining dies excluding the target dies from the entire dies, and store dummy check point information and identification information corresponding to the dummy check point information.

First, a case where the execution circuitry 1352 performs the first check pointing operation is described. When the size of the check point information in the check point information list of the memory 144 is 100 KB, the predetermined size by which the program operation can be performed on each die is 32 KB, and therefore, the execution circuitry 1352 may perform the first check pointing operation on a total of 4 dies. The execution circuitry 1352 may sequentially program first to fourth check point information CP_1 to CP_4 and first to fourth identification information T1 to T4 corresponding thereto into the first memory block in each of the first to fourth dies. In other words, the execution circuitry 1352 may sequentially program the first check point information CP_1 and the first identification information T1 into the first memory block of the first die, the second check point information CP_2 and the second identification information T2 into the first memory block of the second die, the third check point information CP_3 and the third identification information T3 into the first memory block of the third die, and the fourth check point information CP_4 and the fourth identification information T4 into the first memory block of the fourth die.

Next, a case where the execution circuitry 1352 performs the first and second check pointing operations is described. When the size of the check point information in the check point information list of the memory 144 is 64 KB, the execution circuitry 1352 may perform the first check pointing operation on a total of 2 target dies, and store the check point information and the identification information corresponding thereto. For example, the execution circuitry 1352 may store fifth check point information CP_5 and fifth identification information T5 in the first memory block of the first die, and sixth check point information CP_6 and sixth identification information T6 in the first memory block of the second die. The execution circuitry 1352 may check whether the number of entire dies 'A' is equal to the number of target dies 'N'. When the check result indicates that the number of entire dies 'A' is not equal to the number of target dies 'N', the execution circuitry 1352 may perform the second check pointing operation on the remaining dies excluding the target dies from the entire dies, and program the dummy check point information and the identification information corresponding thereto. For example, the controller 130 may sequentially program first dummy check point information and seventh identification information T7 into the first memory block of the third die, and second dummy check point information and eighth identification information T8 into the first memory block of the fourth die. On the other hand, when the number of entire dies 'A' is equal to the number of target dies 'N', the execution circuitry 1352 may complete the check pointing operation.

The recovery manager 136 recovers a loss of the data programmed into the first to fourth dies 1501 to 1504 by using the check point information and the identification information when an SPO occurs in the memory system during the program operation on the plurality of dies. In other words, the recovery manager 136 checks the last stored identification information in the memory block where the check point information in each of the first to fourth dies 1501 to 1504 is stored, when the SPO occurs in the memory system during the command operation in response to the request of the host. For example, the last stored identification information in the memory block of each of the first to fourth dies 1501 to 1504 is the fifth identification information T5 in the memory block of the first die 1501, the sixth identification information T6 in the memory block of the second die 1502, the seventh identification information T7 in the memory block of the third die 1503, and the eighth identification information T8 in the memory block of the fourth die 1504. The recovery manager 136 checks whether the checked plural pieces of identification information have continuous patterns. The check result indicates that the plural pieces of identification information have the continuous patterns in the order of the fifth identification information T5, the sixth identification information T6, the seventh identification information T7 and the eighth identification information T8. In this manner, the recovery manager 136 may perform a data recovery operation using the check point information corresponding to the plural pieces of identification information when the plural pieces of identification information have the continuous patterns. For example, the recovery manager 136 may recover the data by using fifth check point information CP_5 corresponding to the fifth identification information T5, sixth check point information CP_6 corresponding to the sixth identification information T6, first dummy check point information D_CP_1 corresponding to the seventh identification information T7 and second dummy check point information D_CP_2 corresponding to the eighth identification information T8.

On the other hand, when the identification information checked in the memory blocks of the first to fourth dies 1501 to 1504 does not have continuous patterns, the recovery manager 136 checks the positions of plural pieces of previous identification information of the checked identification information, thereby checking whether the previous identification information have continuous patterns. When the previous identification information have continuous patterns, the recovery manager 136 may perform the data recovery operation using the plural pieces of check point information corresponding to the plural pieces of previous identification information.

Figure 6:
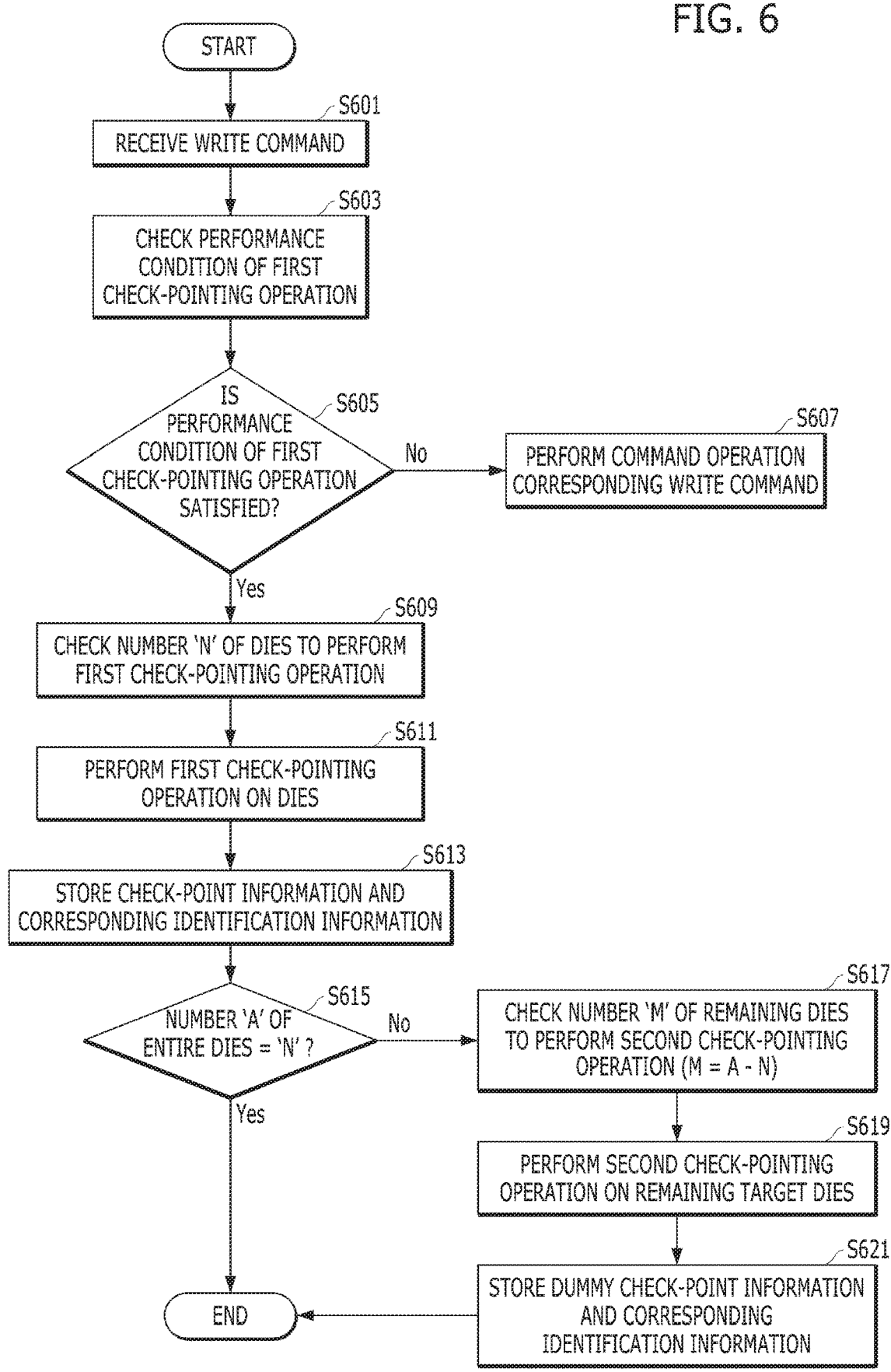
FIGS. 6 and 7 are flowcharts illustrating first and second check pointing operations of a memory system in accordance with an embodiment.
Figure 7:
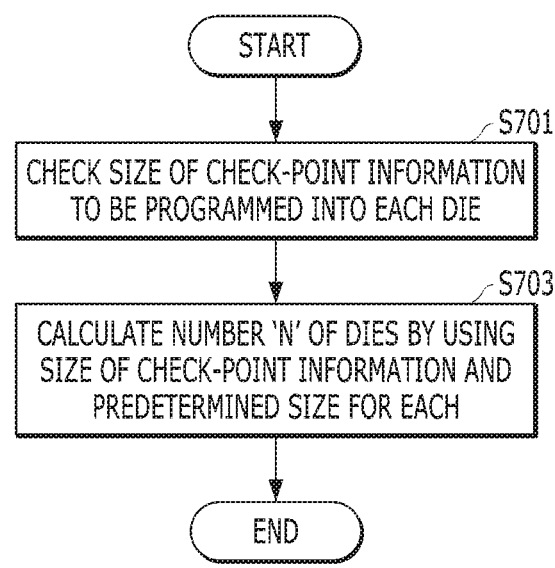

FIGS. 6 and 7 are flowcharts illustrating the first and second check pointing operations of the memory system 110 in accordance with an embodiment.

Referring to FIG. 6, the controller 130 may determine whether to perform the first check pointing operation, by periodically checking the execution time of the first check pointing operation. A case where a target block is changed from a first open block to a second open block among the plurality of memory blocks in each of the first regions of the first to fourth dies 1501 to 1504 or a case where the program operation is performed on the first to fourth dies 1501 to 1504 by a predetermined size may be set to the execution time of the first check pointing operation. In the present embodiment, the case where the target block is changed from the first open block to the second open block among the plurality of memory blocks in each of the first regions of the first to fourth dies 1501 to 1504 will be taken as an example for description. Alternatively, the execution time of the first check pointing operation may be set in various ways.

At step S601, the controller 130 receives a plurality of write commands from the host 102. At step S603 and S605, the controller 130 checks whether the first open block, which is the target block among the memory blocks in each of the first region of the first to fourth dies 1501 to 1504, was changed to a closed block, and the second open block was changed to the target block. When the check result indicates that there remains a free page space in the first open block (that is, "NO" at step S605), the controller 130 may determine that it is not time to perform the first check pointing operation. At step S607, the controller 130 may perform the write command operations on the first open block in each of the plurality of dies. When the check result indicates that the target block was changed to the second open block because there is no free page space in the first open block of the first to fourth dies 1501 to 1504, the controller 130 determines that it is time to perform the first check pointing operation (that is, "YES" at step S605).

At step S609, the controller 130 calculates the number of target dies 'N' to perform the first check pointing operation. A method for calculating the number of target dies 'N' to perform the first check pointing operation is described in detail with reference to FIG. 6. Referring to FIG. 7, the controller 130 checks the size of the check point information in the check point list of the memory 144 at step S701. Subsequently, the controller 130 may calculate the number of target dies 'N' by using the checked size of the check point information and a size set for each die at step S703. For example, when the size set for each die is 32 KB, and the size of the check point information is 64 KB, the number of target dies 'N' is 2.

Referring back to FIG. 6, the controller 130 may perform the first check pointing operation by the calculated number of target dies 'N' at step S611, and store one or more pieces of check point information and the identification information corresponding thereto at step S613. For example, the controller 130 may store the first check point information CP_1 and the first identification information T1 in the memory block of the first die, and the second check point information CP_2 and the second identification information T2 in the memory block of the second die.

At step S615, the controller 130 checks whether the number of entire dies 'A' is equal to the number of target dies 'N'. When the check result indicates that the number of entire dies 'A' is not equal to the number of target dies 'N' (that is "NO" at step S615), the controller 130 checks the number of remaining target dies 'M' on which the first check pointing operation is not performed, among the plurality of dies, at step S617. The controller 130 may perform the second check pointing operation on one or more remaining target dies corresponding to the number of remaining target dies 'M' at step S619, and store the dummy check point information and the identification information corresponding thereto at step S621. For example, the controller 130 may sequentially store the first dummy check point information D_CP_1 and the seventh identification information T7 in the memory block of the third die, and the second dummy check point information D_CP_2 and the eighth identification information T8 in the memory block of the fourth die, since the first and second check point information and the first and second identification information are stored in the memory blocks of the first and second dies among the first to fourth dies.

When the check result indicates that the number of entire dies 'A' is equal to the number of target dies 'N' (that is "YES", at step S615), the controller 130 completes the check pointing operations.

Figure 8:
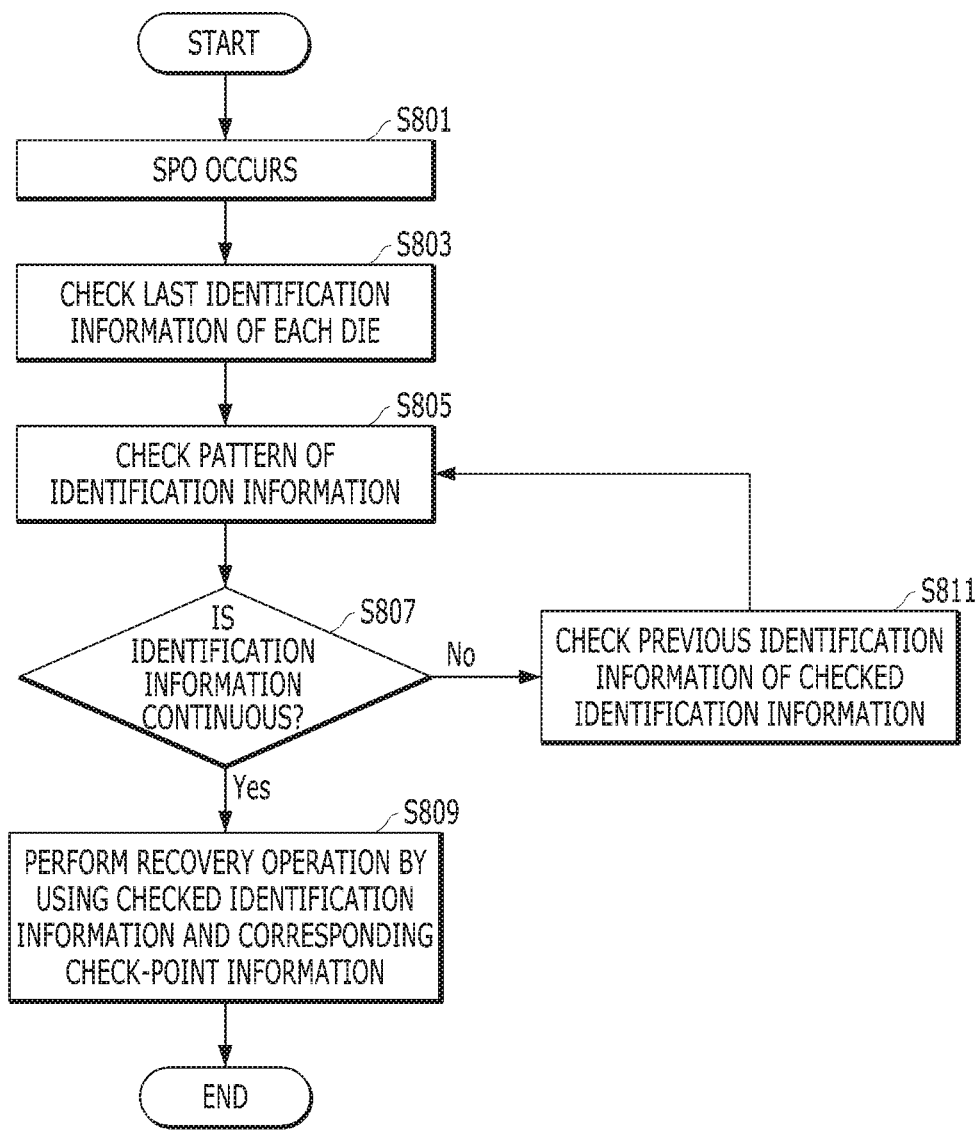
FIG. 8 is a flowchart illustrating a recovery operation of a memory system in accordance with an embodiment.

FIG. 8 is a flowchart illustrating the recovery operation of the memory system 110 in accordance with an embodiment.

Referring to FIG. 8, the controller 130 may detect whether a sudden power off (SPO) occurs at step S801. When the SPO occurs, the check point information in the memory 144, which is a volatile memory, may not remain in the memory 144 after the power is supplied, whereas the check point information in the memory block, which is a nonvolatile memory, may remain in the memory block even after the power is supplied.

At step S803, the controller 130 checks the identification information stored last in the first memory block in each of the first to fourth dies when the SPO occurs in the memory system 110 while a program operation is performed on the dies. For example, the identification information stored last in the first memory block in each of the first to fourth dies is the fifth identification information T5 in the first memory block of the first die, the sixth identification information T6 in the first memory block of the second die, the seventh identification information T7 in the first memory block of the third die, and the eighth identification information T8 in the first memory block of the fourth die.

At step S805 and S807, the controller 130 checks whether the checked plural pieces of identification information have continuous patterns. When the check result indicates that the patterns of the identification information are continuous (that is, "YES" at step S807), the controller 130 may perform the data recovery operation by using the check point information corresponding to the plural pieces of identification information at step S809. For example, it may be seen that the plural pieces of identification information have the continuous patterns in the order of the fifth identification information T5, the sixth identification information T6, the seventh identification information T7 and the eighth identification information T8. Accordingly, the controller 130 may perform the data recovery operation by using the fifth check point information corresponding to the fifth identification information T5, the sixth check point information corresponding to the sixth identification information T6, the first dummy check point information corresponding to the seventh identification information T7 and the second dummy check point information corresponding to the eighth identification information T8.

When the check result indicates that the patterns of the identification information are not continuous (that is, "NO" at step S807), the controller 130 may check plural pieces of previous identification information of the checked plural pieces of identification information at step S811, and reperform the processes from the step S805.

With reference to FIGS. 9 to 17, a data processing system and electronic appliances, to which the memory system 110 including the memory device 150 and the controller 130 described above, may be applied, in accordance with embodiments, are described.

Figure 9:
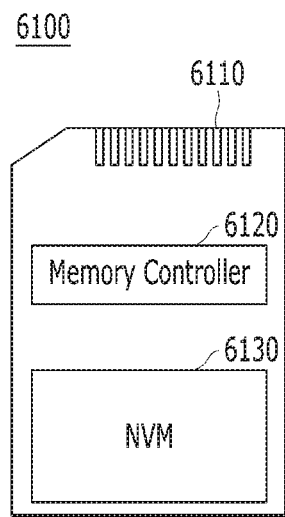
FIGS. 9 to 17 are diagrams schematically illustrating application examples of the data processing system shown in FIG. 1 in accordance with various embodiments of the present invention.

FIG. 9 is a diagram illustrating a data processing system including a memory system in accordance with an embodiment. For example, FIG. 9 illustrates a memory card system 6100 to which the memory system is applied.

Referring to FIG. 9, the memory card system 6100 includes a connector 6110, a memory controller 6120 and a memory device 6130.

The memory controller 6120 is connected with, for access to, the memory device 6130, which is implemented as a nonvolatile memory (NVM). For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include circuitry such as a random access memory (RAM), a processor, a host interface, a memory interface and an error correction circuitry.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral circuitry interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The memory controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 10:
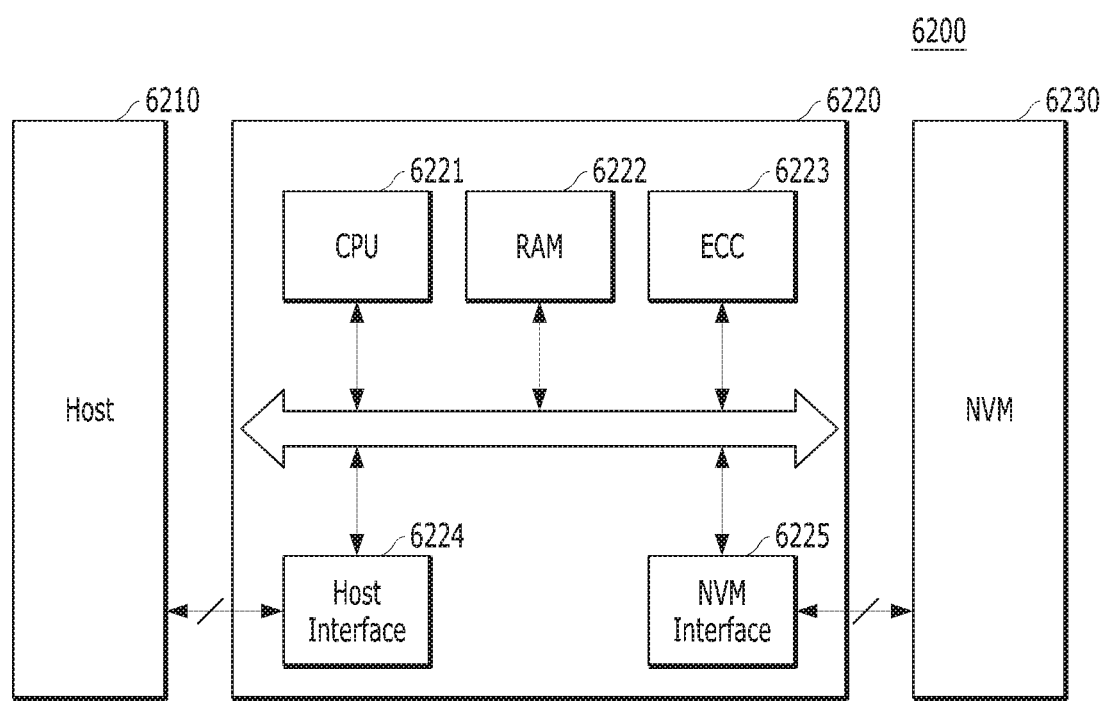

FIG. 10 is a diagram illustrating a data processing system 6200 including a memory system in accordance with an embodiment.

Referring to FIG. 10, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 to operate at a high speed.

The ECC circuit 6223 generates an error correction code (ECC) for correcting a failed bit or an error bit in the data received from the memory device 6230. The ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using any of various coded modulations such as an LDPC code, a BCH code, a turbo code, a Reed-Solomon code, a convolution code, an RSC, a TCM and a BCM.

The memory controller 6220 exchanges data with the host 6210 through the host interface 6224, and exchanges data with the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or another external device. Specifically, as the memory controller 6220 is configured to communicate with an external device through at least one among various communication protocols, the memory system and the data processing system may be applied to wired and/or wireless electronic appliances, particularly a mobile electronic appliance.

Figure 11:
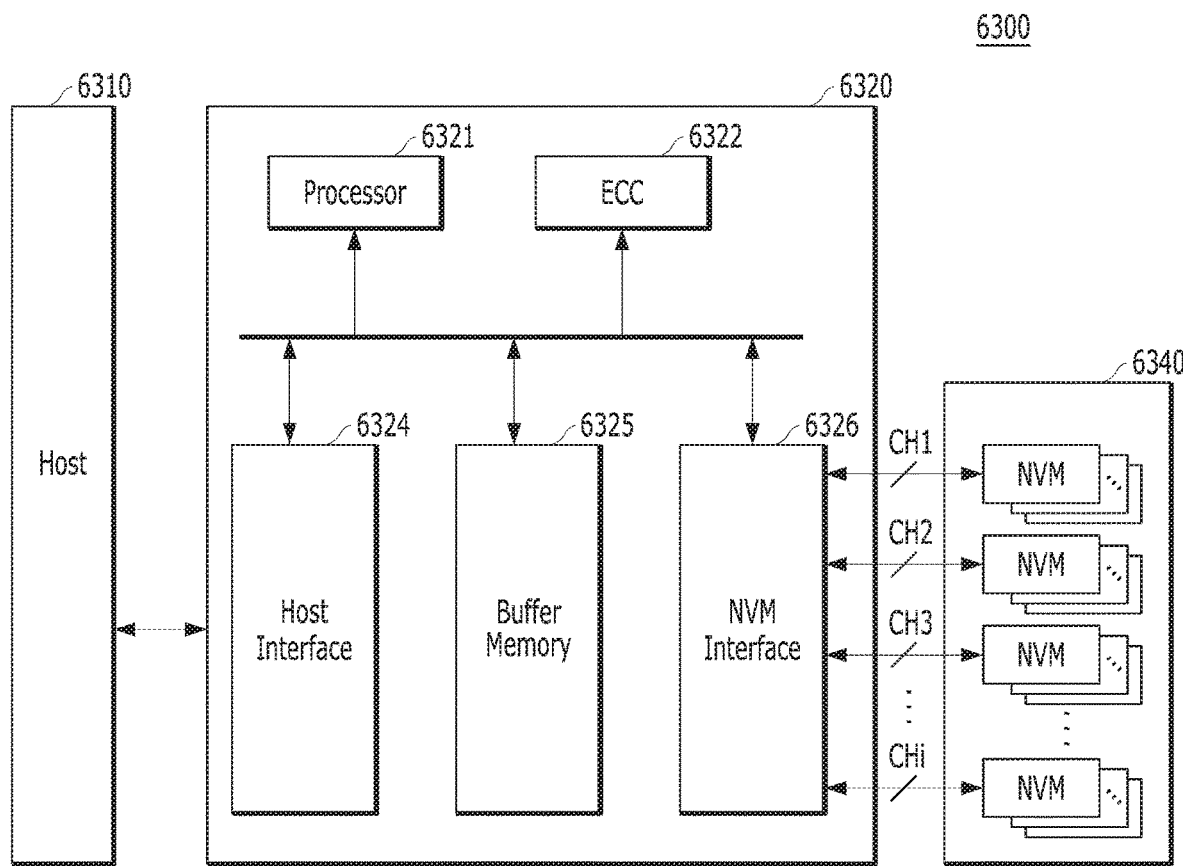

FIG. 11 is a diagram illustrating a data processing system including a memory system in accordance with an embodiment. For example, FIG. 11 illustrates a solid state drive (SSD) 6300 to which the memory system is applied.

Referring to FIG. 11, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, . . . and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM or a nonvolatile memory such as, but not limited to, an FRAM, an ReRAM, an STT-MRAM and a PRAM. While it is illustrated in FIG. 11 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310. The nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the received write command received, among a plurality of RAID levels, that is, the plurality of SSDs 6300, and may output data corresponding to the write command to the selected SSD 6300. In the case of performing a read operation by receiving a read command from the host 6310, the RAID controller may select at least one memory system, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 12:
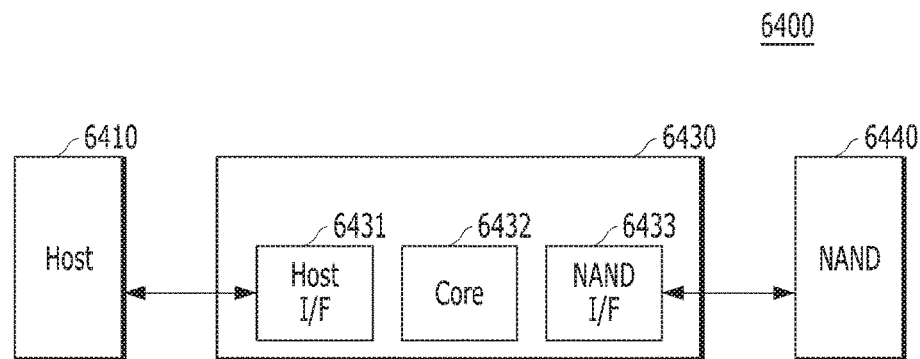

FIG. 12 is a diagram illustrating a data processing system including a memory system in accordance with an embodiment. For example, FIG. 12 illustrates an embedded multimedia card (eMMC) 6400 to which the memory system is applied.

Referring to FIG. 12, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, and may be a serial interface, for example, an ultra high speed (UHS)-I/UHS-II and a UFS interface.

FIGS. 13 to 16 are diagrams illustrating examples of data processing systems including a memory system in accordance with embodiments. Each of FIGS. 13 to 16 illustrates a universal flash storage (UFS) to which the memory system is applied.

Referring to FIGS. 13 to 16, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the likes, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 13 to 16, and the UFS cards 6530, 6630, 6730 and 6830 may be implemented in the form of the memory card system 6100 described above with reference to FIG. 9.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, various card protocols such as universal storage bus (USB) Flash Drives (UFDs), multi-media card (MMC), secure digital (SD), mini SD and Micro SD.

Figure 13:
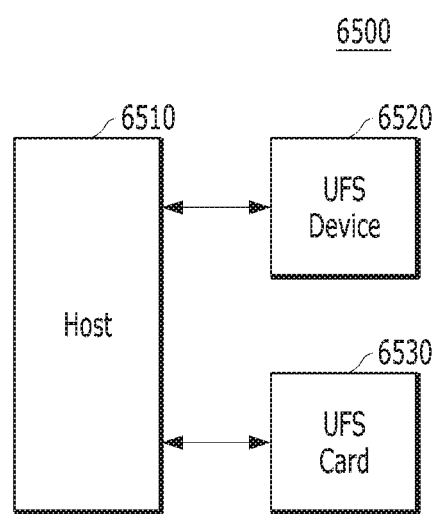

In the UFS system 6500 shown in FIG. 13, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

Figure 14:
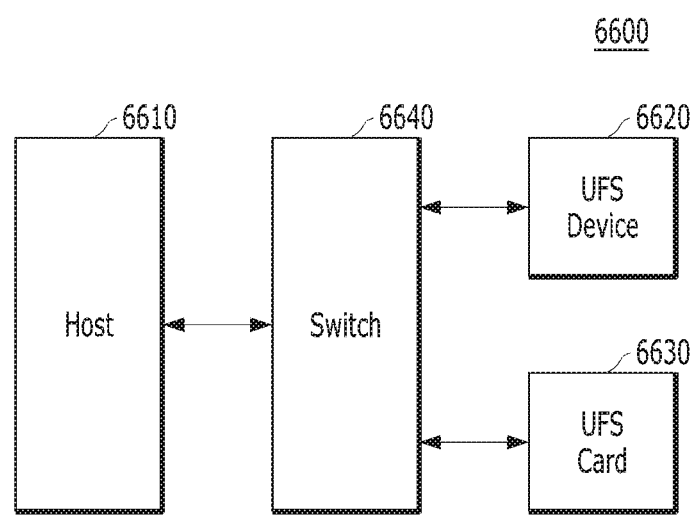

In the UFS system 6600 shown in FIG. 14, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 15:
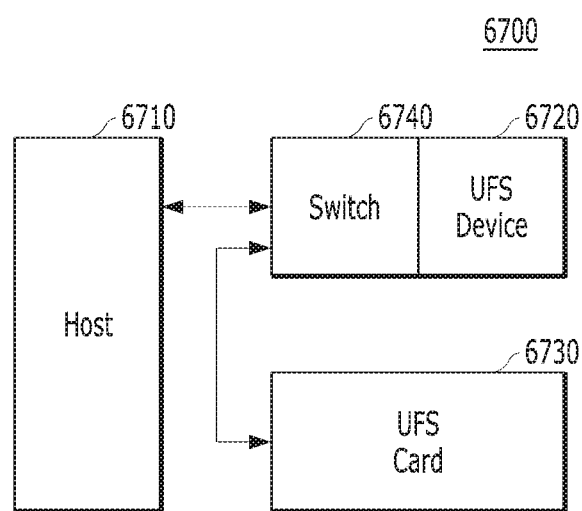

In the UFS system 6700 shown in FIG. 15, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 16:
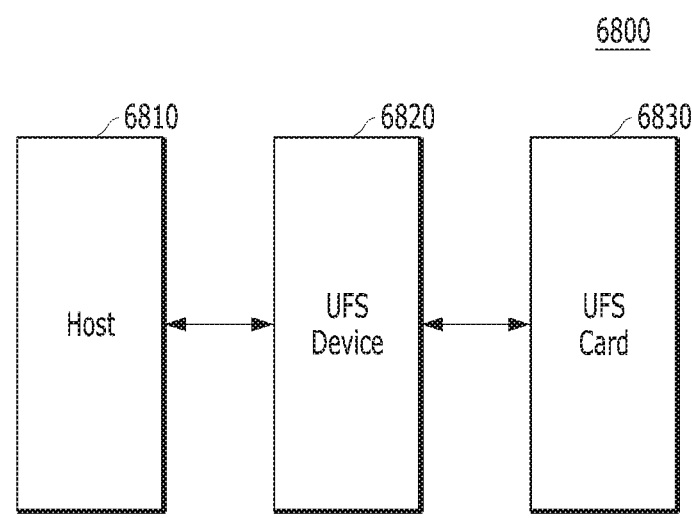

In the UFS system 6800 shown in FIG. 16, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 17:
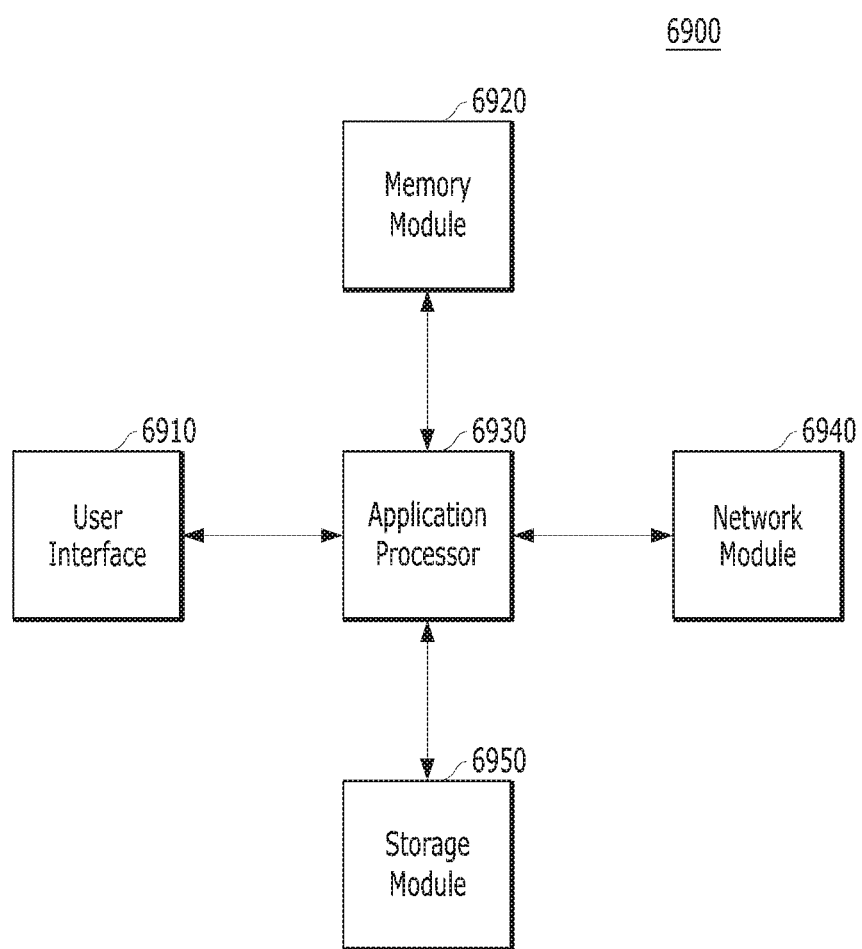

FIG. 17 is a diagram illustrating a data processing system including a memory system in accordance with an embodiment. For example, FIG. 17 illustrates a user system 6900 to which the memory system is applied.

Referring to FIG. 17, the user system 6900 includes a user interface 6910, a memory module 6920, an application processor 6930, a network module 6940, and a storage module 6950.

The application processor 6930 drives circuitries included in the user system 6900 and an operating system (OS). For example, the application processor 6930 may include controllers for controlling the circuitries included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For example, the application processor 6930 and the memory module 6920 may be mounted by being packaged on the basis of a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. Thus, the memory system and the data processing system may be applied to wired and/or wireless electronic appliances. The network module 6940 may be included in the application processor 6930.

The storage module 6950 may store data, for example, data received from the application processor 6930, and transmit data stored therein, to the application processor 6930. The storage module 6950 may be implemented by a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 and an external drive. That is to say, the storage module 6950 may correspond to the memory system 110 described above with reference to FIG. 1, and may be implemented as the SSD, eMMC and UFS described above with reference to FIGS. 12 to 16.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

According to the embodiments, as the barrier operation is not performed on a plurality of dies but the check pointing operation is performed, an idle time between the write operation and the check pointing operation may be reduced, thereby improving the interleaving performance.

In addition, as a plurality of check pointing operations are performed on a plurality of dies, a plurality of identifiers corresponding to the check pointing operations are generated. Accordingly, when an SPO occurs, data may be effectively recovered using the identifiers of the check pointing operations.

While the present invention has been described with respect to specific embodiments, it will be apparent to those skilled in the art that various changes and modifications may be made without departing from the spirit and scope of the invention as defined in the following claims.

What is claimed is:

1. A memory system comprising:
   a plurality of dies including a plurality of memory blocks, each die including a first region and a second region; and
   a controller using a memory storing plural pieces of check point information,
   wherein the controller includes:
   a check point manager suitable for performing a check pointing operation by programming identification information and check point information on the plurality of memory blocks, according to the size of the plural pieces of check point information; and a recovery manager suitable for resuming an operation stopped due to a sudden power-off (SPO) by using last check point information and last identification information, which are programmed last in memory blocks in each of the dies when the SPO occurs, and wherein the check point manager includes:

execution time determination circuitry suitable for determining whether to perform a first check pointing operation, by periodically checking an execution time of the first check pointing operation; and execution circuitry suitable for performing the first check pointing operation or performing the first check pointing operation and a second check pointing operation according to the size of the plural pieces of check point information.

2. The memory system of claim 1, wherein the first check pointing operation includes an operation to program corresponding check point information including map information of a map segment, which is stored in the memory and identification information capable of identifying the check point information into the memory blocks in the plurality of dies, based on the plural pieces of check point information, and the second check pointing operation includes an operation to program dummy check point information and identification information capable of identifying the dummy check point information into memory blocks in one or more remaining dies on which the first check pointing operation is not performed.

3. The memory system of claim 1, wherein the check point information is associated with a background operation or an operation according to a request of a host, and includes essential check point information and dummy check point information.

4. The memory system of claim 1, wherein the execution time of the first check pointing operation includes any one of a case where memory blocks in the first region are changed to closed blocks and a case where a program operation is performed on memory blocks in the first region corresponding to a set size.

5. The memory system of claim 1, wherein the execution circuitry checks the size of the plural pieces of check point information in the memory, and checks the number of target dies for performing the first check pointing operation using the checked size and a set size for each die.

6. The memory system of claim 5, wherein the execution circuitry performs the first check pointing operation to program essential check point information and corresponding identification information on one or more dies among the plurality of dies in an interleaving manner, the one or more dies corresponding to the checked number of target dies.

7. The memory system of claim 6, wherein the execution circuitry checks whether the number of target dies is less than the number of the plurality of dies after performing the first check pointing operation, and programs dummy check point information and identification information corresponding to the dummy check point information by performing the second check pointing operation on one or more remaining target dies except for the target dies on which the first check pointing operation has been performed among the plurality of dies, when the number of target dies is less than the number of the plurality of dies.

8. The memory system of claim 1, wherein the recovery manager checks the last identification information, and then determines whether patterns of the checked identification information are continuous.

9. The memory system of claim 8, wherein the recovery manager resumes the operation stopped due to the SPO by using the checked identification information and check point information corresponding to the identification information when the patterns of the checked identification information are continuous, and rechecks the patterns of identification information by checking the previous identification information of the checked identification information when the patterns of the checked identification information are random.

10. An operating method of a memory system including a controller that includes a memory and a processor, and a plurality of dies that include a plurality of memory blocks, the operating method comprising:

calculating the number of one or more target dies to perform a first check pointing operation according to the size of check point information stored in the memory;

programming essential check point information and identification information corresponding to the essential check point information by sequentially performing the first check pointing operation on memory blocks in one or more dies, among the plurality of dies, according to the calculated number of target dies;

checking whether the calculated number of target dies is equal to the number of the plurality of dies; and programming dummy check point information and identification information corresponding to the dummy check point information by performing a second check pointing operation on remaining target dies except for the target dies among the plurality of dies, when the calculated number of target dies is less than the number of the plurality of dies.

11. The operating method of claim 10, further comprising resuming an operation stopped due to a sudden power-off (SPO) by using last check point information and last identification information, which are programmed last in memory blocks in each of the dies, when the SPO occurs.

12. The operating method of claim 10, wherein the essential and dummy check point information include information associated with a background operation or an operation according to a request of a host.

13. The operating method of claim 10, wherein further comprising determining whether to perform the first check pointing operation by periodically checking an execution time of the first check pointing operation, before the performing of the first check pointing operation.

14. The operating method of claim 13, wherein the execution time of the first check pointing operation includes any one of a case where memory blocks in the first region are changed to closed blocks and a case where a program operation is performed on memory blocks in the first region corresponding to a set size.

15. The operating method of claim 10, wherein the checking of the number of target dies to perform the first check pointing operation comprises checking the size of the plural pieces of check point information in the memory, and checking the number of target dies to perform the first check pointing operation, using the checked size and a set size for each die.

16. The operating method of claim 11, further comprising checking identification information corresponding to the last check point information when the SPO occurs, and then determining whether patterns of the checked identification information are continuous.

17. The operating method of claim 16, further comprising resuming the operation stopped due to the SPO by using the checked identification information and check point information corresponding to the identification information when the patterns of the checked identification information are continuous, and rechecking the patterns of identification information by checking the previous identification information of the checked identification information when the patterns of the checked identification information are random.

18. A memory system comprising:
a plurality of dies, each die including a plurality of memory blocks for storing multiple pieces of check point information; and
a controller configured to:
calculate a number of one or more target dies among the plurality of dies to perform a first check pointing operation based on check point information stored in a memory;
perform the first check pointing operation on the one or more target dies for programming essential check point information and identification information corresponding to the essential check point information;
check whether the calculated number of target dies is equal to the number of the plurality of dies; and
perform a second check pointing operation on at least one remaining die except for the one or more target dies among the plurality of dies, for programming dummy check point information and identification information corresponding to the dummy check point information, when the calculated number of target dies is less than the number of the plurality of dies.

19. The memory system of claim 18, wherein the controller is further configured to resume an operation stopped due to a sudden power-off (SPO) by using last check point information and last identification information, which are programmed last in memory blocks in each of the dies, when the SPO occurs.

* * * * *